United States Patent
Calhoun

[11] 3,708,680
[45] Jan. 2, 1973

[54] CONTAINER INSPECTION APPARATUS WITH PLURAL DETECTORS AND ROTATING PROJECTION SYSTEM

[75] Inventor: Fredrick L. Calhoun, Torrance, Calif.

[73] Assignee: Automatic Sprinkler Corporation of America, Cleveland, Ohio

[22] Filed: June 4, 1968

[21] Appl. No.: 734,394

[52] U.S. Cl.................................250/223 B, 356/240
[51] Int. Cl.................................................H01j 39/12
[58] Field of Search............250/223 B, 233; 356/240

[56] References Cited

UNITED STATES PATENTS 3,081,666   3/1963   Calhoun et al................250/223 B X
3,133,640   5/1964   Calhoun et al.............250/223 B UX
3,292,785   12/1966   Calhoun............................250/223 B

FOREIGN PATENTS OR APPLICATIONS 702,548   1/1965   Canada..............................250/223 B Primary Examiner—James W. Lawrence
Assistant Examiner—D. C. Nelms
Attorney—Smyth, Roston and Pavitt

[57] ABSTRACT

An apparatus for inspecting containers is disclosed in which a rotating and nutating projection of an inspection field is sensed by a photocell arrangement, each cell being provided with one or several light stops. The output signals of adjacent cells are a-c processed in different channels.

12 Claims, 6 Drawing Figures

INVENTOR:
Fredrick L. Calhoun

ATTORNEYS

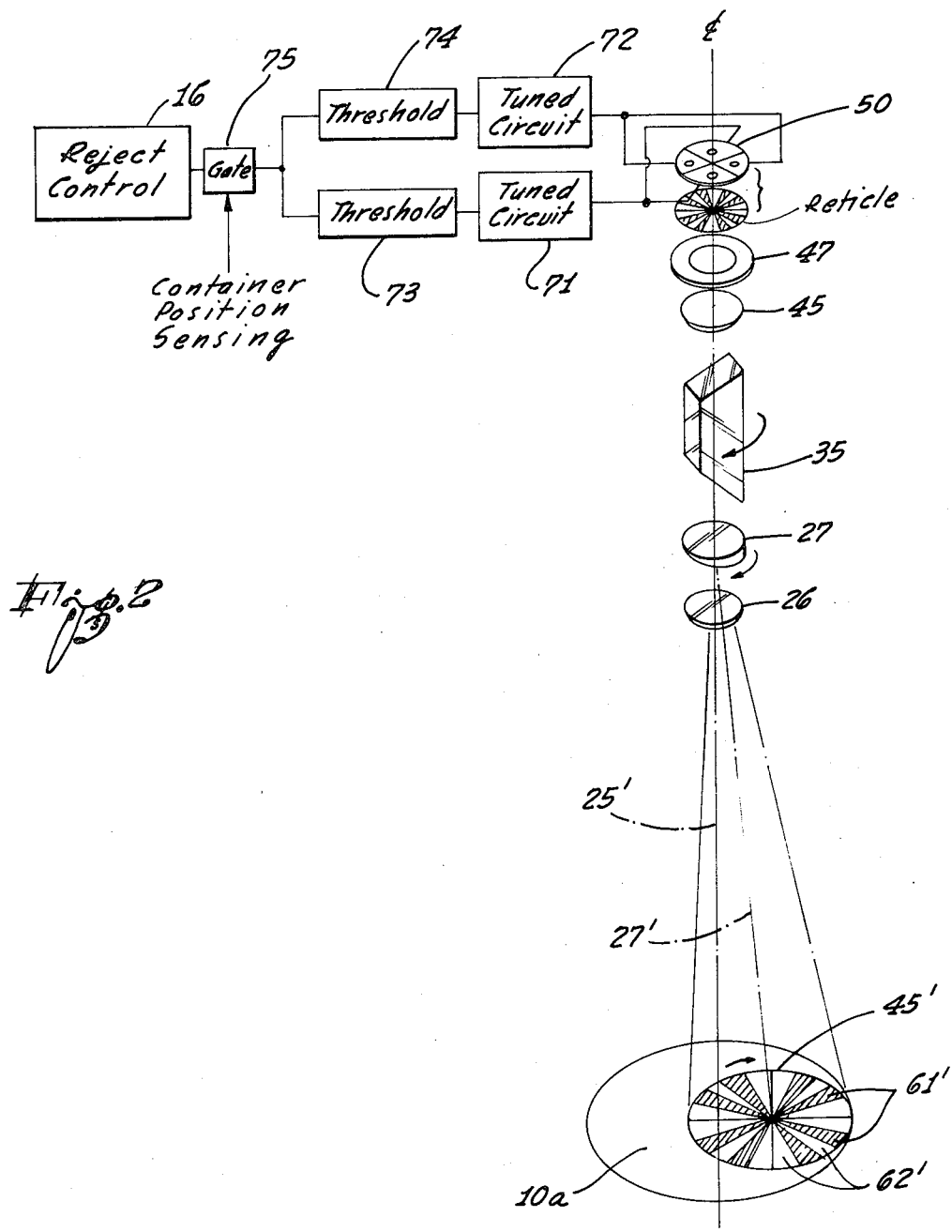

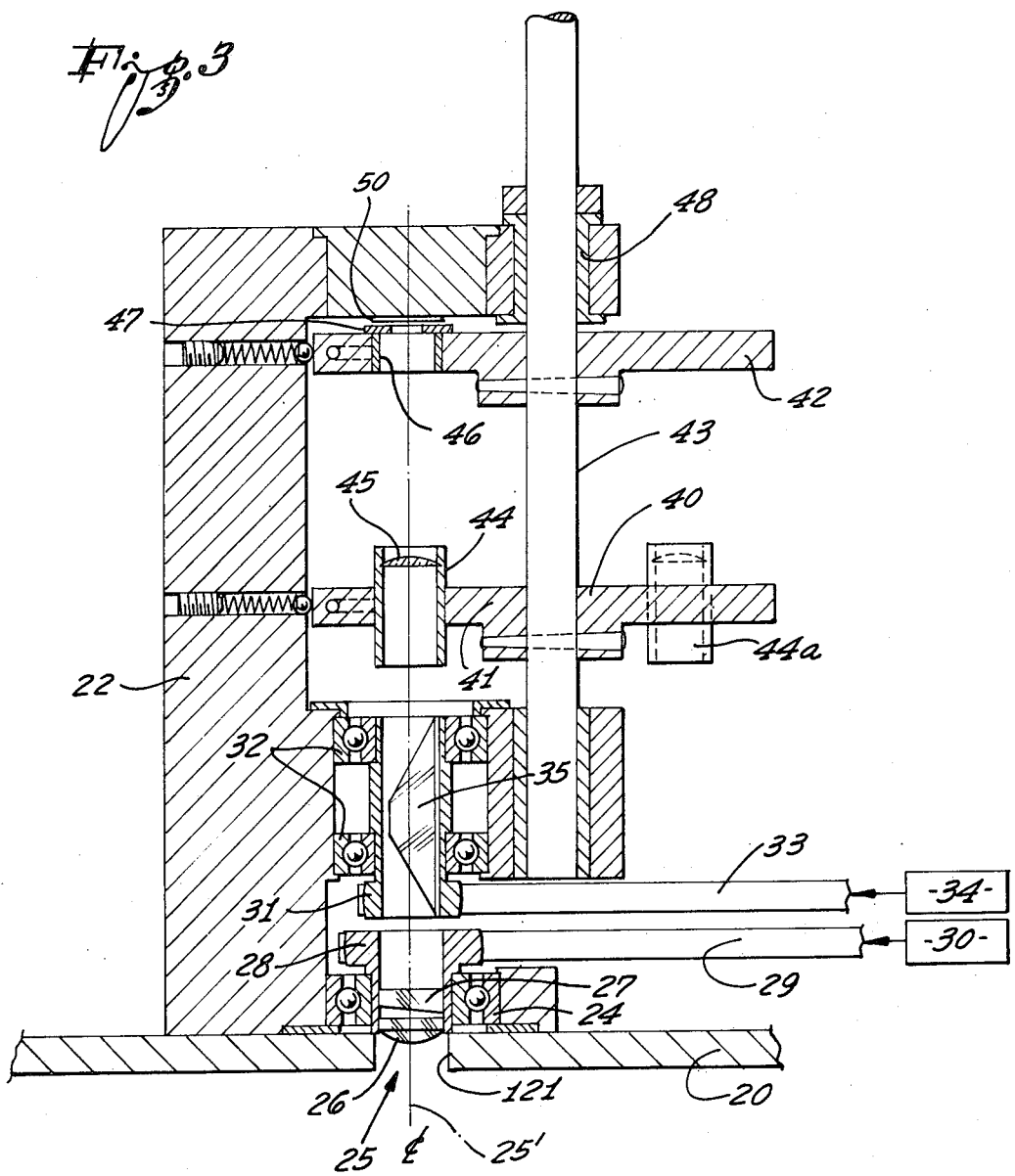

CONTAINER INSPECTION APPARATUS WITH PLURAL DETECTORS AND ROTATING PROJECTION SYSTEM

The present invention relates to an apparatus for inspecting containers, such as bottles for cleanliness.

When bottles or other, preferably transparent devices, are photoelectrically scanned, small particles of foreign matter are generally difficult to detect. Systems are known employing a rotating reticle as part of a photoelectric scanning system to facilitate detection of small foreign particles. The reticle intercepts the light from the illuminated bottle to a photocell which also forms part of the photoelectric scanning means.

The reticle is made up of alternating opaque and transparent areas which are successively interposed between any foreign particles in the bottle and the photocell. The optical input of the photocell thus varies and the resulting electrical output signal includes an alternating component which has a frequency related to the alternating speed of the reticle and the number of alternating opaque and transparent areas of the reticle. If foreign particles are not present in the bottle, the photocell receives light at a constant level, and its output is substantially a direct current and unaffected by the rotation of the reticle accordingly.

A system of this type works generally satisfactorily, except that centrally located foreign particles to be detected can escape detection. A small centrally located particle, scanned through alternating opaque and transparent reticle portions of comparable or even smaller dimensions in angular direction, will produce little modulation of the light. To overcome this problem of a low system sensitivity in the center of the inspection field, it has been suggested to differentiate between the total field of inspection and the instantaneous field of inspection, the latter being smaller than the former and being eccentrically located thereto. The instantaneous field of inspection is primarily determined as to its overall dimensions of the optical input aperture of the photoelectric device. The opaque portions of the reticle operate as temporary light stop, blocking light from a portion of the instantaneous field of inspection as usual. The scanning and inspection devices are constructed so that the instantaneous field of inspection sweeps over the total field of inspection, while the light stop (reticle) positions vary in relation to the instantaneous field of inspection.

If the diameter of the instantaneous field of inspection is, for example, only a little larger than the diameter of the total field of inspection, one obtains an almost uniform sensitivity for the entire (total) inspection field. The presence of foreign particles exhibits itself as signals of particular frequency in the output of the photocell. An analysis shows that the particular frequency is within a band defined by the characteristics of the reticle, as mentioned above, by the rotational speed thereof, as well as by the sweeping speed of the scanner. This has the advantage that foreign particles representing signals can still occur only within a narrowly selectible frequency band, and through appropriate tuning techniques in the output circuit of the photocell, the signal-to-noise ratio of the system is basically high. Thus, the response threshold representing minimum size of a particle recognized as the foreign particle, can be rather low. That minimum particle size is a substantially uniform one for the entire surface to be inspected.

Systems of this type operate very satisfactorily but the following problems have arisen. It may happen that a relatively large foreign particle or dirt patch is located so that it is partially "covered" by operation of one or more opaque portions of the reticle and partially uncovered by one or more transparent portions of the reticle; as the reticle rotates, the overall light balance reaching the photocell is not or very little changed, i.e., the modulation is self-canceling.

A related self-canceling situation arises as follows: Since the containers to be inspected are in motion during the inspection, the looking time or inspection period is rather short. In particular, one sweep of the instantaneous field of inspection over the total inspection field should suffice. It may now occur that two particles are located close to the periphery of the total inspection field and such that covering and uncovering by opaque reticle portions alternate; again the light reaching the photocell is modulated very little. This self-canceling could be avoided by several sweeps over the total inspection field with a nonintegral relation between sweep rate and reticle rotation. However, an extended looking time or inspection period operates ultimately as a slow down of container transport speed which is undesirable.

Another problem is the following. The inspection system has basically three important optical planes. One plane is the bottom of the container to be inspected, which, so to speak, is the optical object plane. Then, there is the plane of the photocell or photodetector onto which an image of the bottom of the container is either projected directly or the photodetector is positioned so that it can observe (virtually) an image produced from the bottom. In addition, there is the reticle. In view of the fact that the reticle is mounted for rotation, it cannot be positioned in either plane. On the other hand, the reticle must be positioned such that the opaque portions when projected into the instantaneous field of inspection have rather sharp boundaries.

It has to be observed now that an inspection station is used to inspect different bottles at different times. Since the inspection station should be as close as possible, to the surface to be inspected, (such as the container bottom), the distance of the station from that surface will vary with the height of the bottle. In other words, the inspection station must be constructed for variable optical conditions. In view of the three planes involved, such adaption invokes considerable difficulties. Of course, that problem could be solved by having a completely new optical system for each separate bottle to be inspected. However, the invention, while solving the self-canceling problems outlined above, points also to a solution which makes the adaption of the system for different bottles considerably easier.

In essence, the inspection system, in accordance with the preferred embodiment of the invention, includes an optical imaging or projection system which provides a rotating instantaneous inspection field and which, in addition, is caused to nutate over the total field of inspection. A stationary reticle is preferably provided directly in the plane of the photo detector which is comprised of a plurality of cells, each being partially covered by one or more opaque spokes of the reticle. The provision of several photocells results in an electrically produced coarse modulation of the outputs of each photocell when the projected inspection field sweeps over the detectors. The provision of a few opaque reticle spokes above each cell produces optically a fine modulation effective as such in the output signal of each photocell.

Electric circuit means are connected to the several photoelectric cells such that the output signals of adjacent cells are processed separately, particularly as to any a-c components of their output signals in the frequency band of interest. As the instantaneous field of inspection performs a double sweep, while the reticle-photocell structure remains stationary, the canceling effect outlined above will not occur. If the projection of a large dirt patch sweeps over the cells, the output of any cell will not be influenced by the fact that the projection of the same dirt patch sweeps also over a neighboring cell but at different phase. Independent processing of the signals of adjacently located cells prevents cancelation of signals which are possibly in phase opposition as to the "patch sweep" over them.

Since photocells and reticle form a nonrotatable, uniform structure for positioning in the same plane, such structure could be made longitudinally adjustable along the optical axis as a means for adapting the unit to differently high bottles, i.e., to a different object distance.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawing in which:

FIG. 2 illustrates schematically in perspective view the optical system within the apparatus in accordance with the preferred embodiment of the invention and includes a circuit block diagram for processing photo detector signals;

FIG. 3 illustrates a section view into a portion of the inspection station illustrated in FIG. 1;

Figure 1:
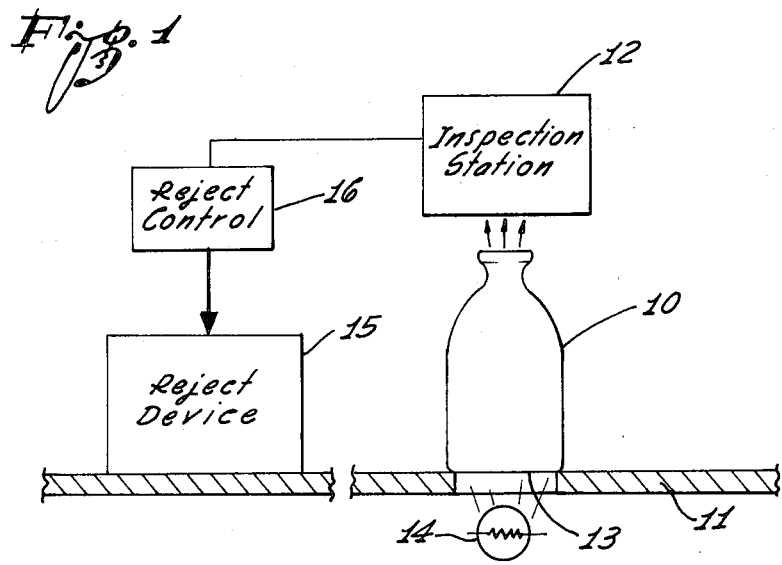
FIG. 1 illustrates a container inspection and reject control system in which the invention can be practiced with advantage.

Proceeding now to a detailed description of the drawings, in FIG. 1 thereof, there is illustrated somewhat schematically the layout of a container inspection and reject station in which the preferred embodiment of the present invention is practiced with advantage. Containers 10, such as bottles, are transported on a conveyor belt 11, past an inspection station 12. The container 10 is presumed to be transparent to some extent, i.e., its wall, and most particularly its bottom, is not completely opaque. Within this rule, however, the range of permissible transparency may vary widely. For example, the bottle 10 may be a clear glass bottle but it can also be a dark brown or green bottle, such as commonly used for bottled beer or other beverages.

The specific construction of the conveyor belt 11 and of its drive mechanism, is not important. However, the conveyor belt 11 must be provided with windows 13 or other types of transparent sections permitting passage of light from a stationary light source 14 positioned underneath conveyor belt 11. The light source 14 thus illuminates a bottle 10 when on such a window 13 from below. In particular, the bottom of a bottle is illuminated when passing through the range of lamp 14 and window 13. The bottom of the bottle itself modulates the illumination, but only as a more or less uniform attenuation; foreign particles operate as partial or complete, contrast-producing light stops and locally diminish the light passing through accordingly.

The lamp 14 is positioned essentially in optical alignment with an optical system in that portion of the inspection station 12, which is disposed above the conveyor 11 and described in greater detail later in this specification. The inspection station 12 includes optical-electrical conversion means which provide signals representative of cleanliness of a bottle when passing through the range of the inspection station 12. As during different inspection runs different groups of different height containers may pass the inspection station, the station may be positioned adjustable as to its distance from belt 11, and as indicated by the double arrow.

Farther down the path of the conveyor 11 a reject device 15 is provided which can remove bottles from the conveyor 11. Devices of this type are, for example, described in my U.S. Pat. No. 3,279,881. The reject device 15 is under control of the reject control circuit 16 receiving the signals from the inspection station 12 representing the presence or absence of foreign particles in a container 10 that is being inspected. In case a foreign particle has been detected, the output of station 12 triggers reject control 16 to cause the reject device 15 to remove the bottle from the conveyor 11, for example, by passing it to a branching conveyor or the like. A clean container causes the reject control and the device 15 to remain disabled. The reject control may include signal storage facilities for reject signals in order to bridge the travel time of a container from station 12 to the actuating range of reject device 15.

After describing the general layout of the system in which the invention is practiced, I proceed to the description of FIGS. 2 and 3, which illustrate in greater detail the salient components of inspection station 12. The inspection station 12 includes a housing 20 of which is shown only the lower or bottom portion. In the interior of housing 20 there is a frame 22 for mounting the several elements described in the following. The bottom of housing 20 has an aperture 21 which is optically aligned with the lamp 14, i.e., it is optically aligned with the desired position for a container when being inspected. The specific alignment of a container with aperture 21 can be monitored by separate detectors (not shown) which enable the inspection station for limiting the looking time or inspection period to a period beginning shortly before and ending shortly after alignment of a container 10 with the aperture 21.

A first optical unit 25 having optical axis 25' is provided in aperture 21 and is comprised of a primary lens 26 and of a wedge prism 27. The wedge prism 27 causes a relative deflection of an optical path along axis 25' to run along an axis 27'. The two elements 26 and 27 are mounted in the interior of a hollow pulley 28 which is journaled by bearings 24, so that the axis of rotation coincides with the optical axis 25' of the primary lens 26 and traverses the center of aperture 21. The pulley 28 is driven through a belt 29 coupled to a drive 30 illustrated only schematically.

A second pulley 31 is journaled above pulley 28 and coaxially thereto. Pulley 31 is likewise hollow and a dove prism 35 is mounted in the hollow space. Dove prism 35 is in the optical path along axis 25'. Pulley 31 is particularly journaled by means of bearings 32 in support frame 22 and is driven through a belt 33 by means of a drive 34. The two drives 30 and 34 are illustrated only schematically. Basically they may have the same prime mover, such as a motor, and different gears or other transmission means provide separately motive power to the two belts 29 and 33. For reasons below the two pulleys 31 and 28 have differing speeds.

A turret 40 is provided with two disks 41 and 42, mounted one above the other on a shaft 43, and both above the arrangement in housing 20, as described thus far. Shaft 43 is disposed for rotation in friction bearings 48 and 49, mounted at frame 22. Disk 41 has several apertures in which are received thimbles, such as thimble 44, each thimble having a secondary object lens, such as 45. The several thimbles in turret disk 41 are selectively positionable into optical axis 25' so that the respective secondary lensed form different projection systems together with primary lens 26. The secondary lens 45 in thimble 44 is illustrated in optically aligned position with the elements 26, 27 and 35, accordingly. Secondary leans 45 together with primary lens 27 thus constitutes a particular optical projection system for imaging an object (namely, the bottom of a particular type container) into an image plane in which is mounted a photoelectric detector system 50.

The photocell means 50, particularly its effective optical plane, could be mounted for vertical displacement along axis 25'. The initial selection of thimbles as holders for the different secondary lenses permits placement of any of the secondary lenses in different horizontal planes along axis 25' (see thimble 44a). An exchange of the secondary lenses may become necessary in order to adapt the system more generally to different objects "looked at" through the system as described. For example, the bottom of differently high containers will have different distances from the inspection station. As was mentioned above, the housing 20 should be adjustable in relation to the belt 11 for inspection of different height containers so that the aperture 21 can be positioned always rather close to the top of the containers. This, of course, changes the distance between the primary (and secondary) lens and the bottom of a container to be inspected, while the distance between the primary lens and the image plane (plane of the detector 50) remains constant. In order to adapt the system optically to this variation in object distances (optically speaking), the secondary lenses are being changed through the turret, for placing the thimble with the most suitable secondary lens among those provided in the turrett into the optical path along axis 25'.

It is commonly believed that a dove prism should be traversed by parallel wavefronts, otherwise distortions result. However, it was found that if the focal length of the primary lens is selected to be about half way in the range of object distances from container bottoms expected to occur, which range may cover object distances at about a 2:1 ratio, then the resulting optical distortion has no effect on the operation of the apparatus.

Figure 4:
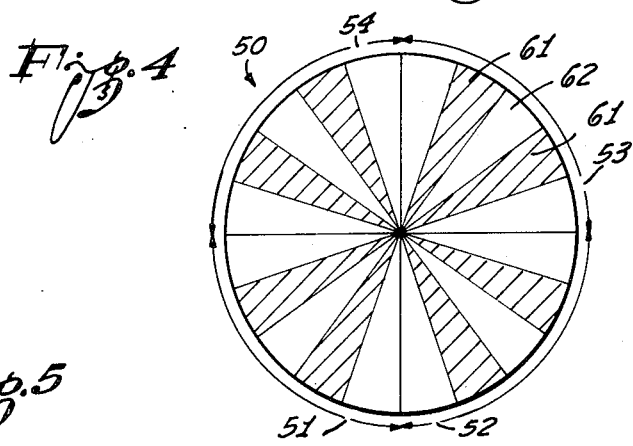
FIG. 4 illustrates a plan view of the photo detector-reticle system in the station as illustrated in FIG. 3.

The second disk 42 of turret 40 on shaft 43 is provided with another set of thimbles including illustrated thimble 46. The thimble 46 defines a particular field stop-aperture 47 in the optical imaging path along axis 25' and positions such aperture in front of photo detector system 50. The photo detector system 50 is, for example, comprised of four pie-shaped or sector-shaped solar cells 51, 52, 53 and 54 with a sector angle of 90° with reference to the center (see FIG. 4). Each of these solar cells of the photo detector systems is provided with an overlaid mask but that mask can be common to the four photocells. That mask has alternating opaque and transparent sector-shaped areas respectively denoted 61 and 62. Each photocell has three sector-shaped or pie-shaped, exposed portions which can receive light, while two pie-shaped sectors are blocked off. The three sector windows 62 for any one of the photocells each has an angle with reference to the common center of the system by 18°, and the opaque reticle spokes 61 have, likewise, a sector angle of 18°.

The optical system as described can be understood best from FIG. 2. The field 10a represents the bottom of a container to be inspected; more generally it is the total inspection field. The optical axis 25' runs through the center of that inspection field at about the middle of the inspection period. However, it is presumed that the field 10a moves very little in relation to that axis during the contemplated short inspection period as indicated by dotted lines representing maximum displacement of the total inspection field from the position in the middle of the inspection period. The field stop 45 when (hypothetically) projected onto field 10a through the optical system 26–45 outlines the instantaneous inspection field 45' which, by operation of the wedge prism 27, is eccentric within the inspection field 10a. The wedge prism 27 thus causes the instantaneous inspection field, particularly the center thereof, to be deflected. This can be restated as follows: the wedge prism 27 causes the center of field 45', as projected along axis 27', to be deflected for projection into and along axis 25'. As wedge prism 27 rotates, because pulley 28 is being rotated by drive 30, the instantaneous inspection field 45' nutates around the axis 25' to sweep the entire inspection field 10a.

The optical system as comprised of primary lens 26, secondary lens 45 and aperture stop 47 images the portion 45' of inspection field 10a onto photocells 50. The image of field 45' is "seen" by the photocell mosaic 50 through the several windows 62 of the reticle only. The spokes 61' as projected by the optical system into the instantaneous field at any instant define therein blind areas or areas of temporary noninspection 61'. These areas 61' are interspaced in the (hypothetical) projection 62' of the three windows 62 of each photocell. These hypothetically projected windows outlining the areas 62' are the individual instantaneous inspection fields. Together they define the common instantaneous inspection fields.

For the moment it shall be assumed that wedge prism 27 does not rotate, so that the field 45' is stationary relative to and within field 10a. As dove prism 35 rotates due to rotation of pulley 31 by operation of drive 34, the projected reticle field rotates about the instantaneous center defined by the intersection of axis 27' and the plane of the object field, which is the bottom of the bottle to be inspected. Thus, the instantaneous inspection field is fully inspected, particularly after rotation of dove prism 27 through an angle equal to the half the sector angle of the opaque spokes. As the sector angle was presumed to 18°, full inspection has occurred after a rotation of dove prism by 9°. It will be recalled that an image projected through a rotating dove prism rotates at twice the speed of the dove prism. As the dove prism rotates at a higher speed than wedge prism, field 45' has moved very little during the 9° deflection of dove prism.

Each photocell, such as 50, 51, etc., defines a quarter pie-shaped inspection field at any instant, composed of three portions corresponding to the three windows 62, resulting from the superimposition of opaque spokes as provided by the reticle. As a consequence, a twofold light modulation is produced by operation of rotation of the instantaneous field of inspection through the dove prism. A "fine" modulation results from the sweep of the field as projected onto cells 50 over the reticle spoke-window sequence of each and all photocells. A coarse modulation results from the sweep of that projected field over the individual photocells as a whole. The fine modulation will result specifically from small particles, the coarse modulation from larger ones. Since additionally small particles are detected to some extent through the coarse modulation as defined while large particles and extensive patches will, to some extent, produce fine modulation, one obtains a rather uniform sensitivity as to modulation for a large range of particles.

Figure 5:
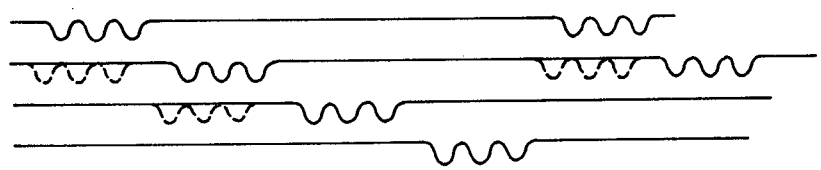
FIGS. 5 and 6 are waveforms of photo detector output signals as they can occur during operation of the system shown in FIGS. 1 through 4.

Each photocell detects a particular brightness which is diminished to some extent if a foreign particle is in one of the three associated areas 62' as defined. Brightness as detected by that cell increases if the foreign particle is within the area 61' of the projected reticle spoke 61. For a relatively small particle, the output signals of the four photocells, i.e., with the dirt particle being present in the instantaneous inspection field, may have a configuration as illustrated in FIG. 5, assuming that the rotation of the dove prism is sufficiently fast in comparison with the rotation of the wedge prism so that the particle traverses the viewing areas for all photocells at least once.

Figure 6:
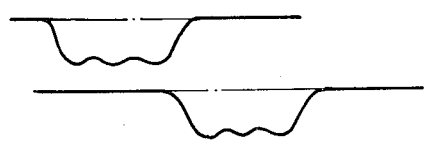

FIG. 6 illustrates representatively the output wave of two juxtaposed cells (for example, 51 and 52) in case of a larger dirt patch; the principle amplitude excursions occur when the (actual) projection of a patch onto the photocells enters and leaves the area outlined by the respective photocell, with little modulation resulting from the spokes. The principle excursions may even overlap. A clean bottle produces a constant d-c output of all photocells. It is the unmodulated level in each of the traces of FIGS. 5 and 6.

A foreign particle which is comparatively small, therefore, produces in each of these photo detectors, a signal which is an a-c signal, superimposed upon d-c level as monitored by each of the photocells. The frequency range of the signal is given by $\Delta f = N(2w_1 \pm w_2)$. In this equation the following terms have been used. The value $w_1$ is the rotational speed of the dove prism; as a dove prism produces a rotation of the optical field on its output side at twice its own rotational speed, the characteristic rotational sweep speed of the instantaneous field 45' is $2w_1$. The value $w_2$ is the nutational speed, as provided by the rotation of wedge prism 27. The $\pm$ signs have to be used in the equation because a particle may be close to the center or more to the periphery of the total inspection field 10a. In the former case, the passage of an increment of the instantaneous inspection field as projected onto alternating opaque spokes and windows moves oppositely to the nutation of the instantaneous inspection field; in the latter case they move in the same direction. $N$ is a number which defines the ratio between the full circle ($2\pi$) and twice the sector angle of an opaque reticle spoke, or, in case they are equal, the sector angle of an opaque reticle spoke plus the sector angle of a juxtaposed window, as they together define a full wavelength of produced (fine) modulation. Therefore, in case of FIG. 2, $N = 10$.

Representatively now let $w_1$ be 416 and $w_2 = 143$, then $\Delta f$ is defined by upper and lower limit frequencies, respectively of 2,430 to 5,590 cps. Considering the output signal of each photocell individually, for example, as shown in FIG. 6, each wave train as produced by any photocell has additionally a fundamental equal to the rotational speed frequency of the rotating field due to the coarse modulation provided by the system. That fundamental frequency is $2w_1 = 832$ cps for the numerical example, and is, of course, per se, very pronounced in case of FIG. 6. However, this fundamental should not be used directly for the detection of large particles as the sweep frequencies themselves should be excluded as noise. Nevertheless, the output train of each photocell, even in case of FIG. 6, still has a strong overall component within that range $\Delta f$ of reticle spoke modulation, provided the signals of neighboring photocells are not algebraically combined. Thus, if the output signals of adjacently positioned cells are processed individually as to detection of components in the frequency range $\Delta f = N(2w_1 \pm w_2)$, even large patches having produced illumination excursions for individual photocells as shown separately for two adjacent cells in FIG. 6, will produce strong components within that frequency range $\Delta f$.

As is illustrated schematically in FIG. 2 the photocells not having a common boundary such as 51 and 53 on one hand, and 52 and 54 on the other hand, are connected in parallel and respectively connected to tuned amplifiers 71 and 72. These amplifiers are, for example, tuned to frequencies within the range $N(2w_1 \pm w_2)$. The detection and tuning range can have a narrow band if $2w_1 >> w_2$, which is beneficial for noise rejection.

If two diametrically positioned cells are, as illustrated, connected in parallel, then the fundamental frequency in each such individual detection circuit, due to modulation resulting from sweeping of the inspection field over the individual photocells, is actually $4 \cdot w_1$ or 1,664 cps for the numerical example given. Thus, only a minor extension of the frequency detection range at the lower end permits utilization of that fundamental, resulting particularly strong from large patches. The upper limit needed for the detection band was given above by $N(2w_1 + w_2)$. Let M be the number of different sector-shaped photocells used. Then the lower limit frequency could be redefined by $2w_1 \times M/2$, in case every other cell around this circular arrangement of cells connects to the same circuit and provided $w_1 M < N(2w_1 - w_2)$ or $(2N-M/N)w_1 > w_2$ which is the case normally. In the chosen example $M = 4$ so that the lower limit frequency is 1.664 kc. In general, the detection band can be narrowed by selecting $M/2$ not too much smaller than N. Most importantly, this redefined detection band still excludes the sweep frequency $2w_1$ itself, which is beneficial, even necessary, for noise suppression.

The outputs of tuned circuits are respectively fed to threshold devices 73 and 74 for reasons of noise suppression. Whenever a detected oscillation within the tuned range exceeds its threshold value, it is permitted to be applied to the signal input of a gate 75. This signal can be regarded as the equivalent of a true or a false signal. It is true, when a single or several foreign particles have been detected, and false when not.

Gate 75 is opened only during the inspection period, i.e., when the bottle container is, in fact, underneath the inspection station 12, which, of course, is only a very short period of time. The output signal of gate 75, whatever the case may be, is provided to the reject control circuit 16 which is of no immediate interest as far as the invention is concerned. Circuit 10 will essentially include a storage device which responds to the presence of a reject command signal as provided by the inspection station 12 and stores the signal, if that command is a true signal, until the container has traveled from the inspection station to the reject device 15, whereupon the rejection process is triggered.

It is evident, from the discussion in relation to the traces of FIG. 6, that the fine-coarse modulation of the signal as processed in each of the two electrical circuit channels is essentially free from the self-cancellation effect resulting from large objects or patches, unless such patches cover essentially the entire or most of the bottle bottom, in which case the d-c signal level has to be processed separately. The system eliminates also another type of cancellation effect. If a foreign particle is positioned to be covered at any instant by the projection of a reticle spoke, while a second foreign dirt particle is not so covered by the projection of a reticle spoke, it may occur that after rotation of the instantaneous field equal to the sector angle of a reticle spoke, the relationship is reversed. In this case the two photocells produce a-c components in opposite phase. The full drawn excursions in FIG. 5 represent, for example, the first foreign particle, the dotted excursions are produced by the second foreign particle. If, and as long as, these signals were additively combined, they may cancel, or at least weaken, each other so that the composite signal does not exceed the detection threshold. Even if the particles were close together, there always will be instants where one particle is in the detection range of one cell while the other one is in the range of another cell. Since neighboring or adjacent cells connect to different circuits, there will be at least one excursion in the output of each cell that is not canceled.

As an operating condition it has been set forth that two adjacent photocells provide these outputs to different circuits. This does not imply that two nonadjacent photocells have to provide their outputs to the same circuit; nevertheless the connection is made in that manner, particularly to include the resulting coarse modulation in the signal trains within the detection band while still excluding the sweep frequencies of the fields themselves. The situation should thus be discussed that two foreign particles, for example, have approximately diametrical opposite positions, so that there is alternating coverage by spokes on photocells feeding the same detector circuit. However, in view of the varying position of the center of the progressing instantaneous field of inspection due to nutation, that relation will not be maintained for long. Instrumental here is also the selection of a rather large speed differential between nutational and rotational speed of the instantaneous field of inspection with a relatively high rotational speed of the dove prism, and a relatively low nutational speed as provided by the wedge prism.

One can see from the relation above that the frequency band of interest can be shifted to a high range if the number of reticle spokes is relatively large so that nutational and rotational frequencies themselves are outside of the detection band. However, with an increased number of spokes the probability of cancelation effects with the area of the same photocell increases, unless the number of photocells used is likewise increased. Thus, there should be not too many opaque or masking spokes per photo detector, otherwise the reticle induced modulation may be too weak for large particles. Two spokes per photocell as illustrated, were found to be highly suitable to obtain achieving satisfactory results.

The invention is not limited to the embodiments described above, but all changes and modifications thereof, not constituting departures from the spirit and scope of the invention are intended to be covered by the following claims.

What is claimed is:

1. In a system for inspecting a container for particles of foreign matter,
   a source of radiant energy disposed relative to the container to provide an energized field for inspection;
   a plurality of radiant energy sensitive means each constructed to receive radiant energy from the energized field and producing a signal at any instant in accordance with the radiant energy received at that instant;
   first means for defining an individual instantaneous inspection field for each of said sensitive means of the plurality, and within said energized field for inspection and coupling said individual instantaneous inspection fields respectively to the sensitive means of the plurality, the several instantaneous inspection fields as associated with all of the sensitive means of the plurality covering less than the energized field for inspection;
   second means coupled to the first means to cause the several instantaneous inspection fields to rotate about a common center;
   third means coupled to the first means to cause that common center to rotate so that the several individual fields of inspection sweep the entire energized field for inspection; and tuned circuit means connected to the radiation sensitive means of the plurality to be responsive to pass band signal components in said signals, the passband being defined by the rotational speeds as provided by the second and third means.

2. In a system for inspecting a container for particles of foreign matter;

a light source disposed relative to the container to provide an illuminated field for inspection;

a plurality of light sensitive means disposed to receive light from the illuminated field, each light sensitive means of the plurality producing an electrical signal at any instant in accordance with the light as received at that instant;

light stop means on each of the light sensitive means separating the radiation sensitive area of the light sensitive means into at least two noncontiguous portions;

optical means for directing at any instant and onto each light sensitive means of the plurality, light from a particular area of the illuminated field, the particular areas from which light is directed to all said light sensitive means at any instant defining a common instantaneous inspection field;

means coupled to the optical means for varying the particular area from which a light sensitive means of the plurality receives light in a direction which when projected upon the light sensitive means is essentially transverse to the direction of the predominant extension of the light stop means thereon;

means coupled to the optical means for progressively varying the common inspection field to progressively cover the entire illuminated field; and tuned circuit means connected to the light sensitive means of the plurality to be responsive to a passband signal component in said signal, the passband being defined by the speed for varying as provided by the first and second means.

3. In a system as set forth in claim 2, the circuit means including a plurality of tuned circuits, a circuit of the plurality being connected to those light sensitive means of the plurality not having a common boundary.

4. In a system for inspecting a container for particles of foreign matter, the combination comprising:

means disposed relative to the container for illuminating the container to provide a field of light as a total field of inspection modulated by the optical characteristics of the container and any particle in the container;

a plurality of light sensitive members disposed in spaced relationship to each other and to said field of inspection;

optical means for providing to said light sensitive means radiation from an instantaneous field of inspection of said total field of inspection, each light sensitive means of the plurality receiving light from a different portion of the instantaneous field of inspection, and including means for causing redirecting the light as provided to the sensitive means corresponding to a rotation of the instantaneous field about its center and further corresponding to nutation of the instantaneous field of inspection about the center of and within said total field of inspection;

reticle means disposed at the light sensitive means to define for each light sensitive means at least one blind zone and at least one zone sensitive to the radiation as provided from a portion of the instantaneous field of inspection by said optical means; and means connected to said light sensitive means to receive therefrom signals representative of the radiation as received by the light sensitive means at any instant.

5. In a system for inspecting a container for particles of foreign matter, the combination comprising:

means disposed relative to the container for illuminating the container to provide a field of light as a total field of inspection modulated by the optical characteristics of the container and any particle in the container;

optical means disposed for providing radiation from an instantaneous field of inspection of said total field of inspection for reception in a particular plane as a projected inspection field and including means for rotating the projected inspection field about its center and for redirecting the optical means corresponding to nutation of the instantaneous field of inspection about the center of and within said total field inspection;

a plurality of light sensitive means disposed in a particular pattern in the particular plane, leaving zones of nonsensitivity between them, each receiving radiation from a portion of the instantaneous field of observation, the light sensitive means together receiving radiation of less than the entire instantaneous field of inspection corresponding to said nonsensitive zones; and means connected to said light sensitive means to receive therefrom signals representative of the radiation as received by the light sensitive means at any instant.

6. In a system as set forth in claim 5, there being a stationary reticle means disposed in the plane of the light sensitive means to define a plurality of blind zones and a plurality of transparent zones for the light sensitive means to be sensitive at the transparent zones to radiation from the instantaneous field of inspection as provided by the optical means.

7. In a system for inspecting a container for particles of foreign matter;

a light source disposed relative to the container to provide an illuminated field for inspection;

a plurality of light sensitive means disposed to receive light from the illuminated field, each light sensitive means of the plurality producing an electrical signal at any instant in accordance with the light as received at that instant;

optical means for directing, at any instant and onto each light sensitive means of the plurality, light from a particular area of the illuminated field, the particular areas from which light is directed to all said light sensitive means at any instant defining a common instantaneous inspection field;

first means coupled to the optical means for progressively varying the particular areas as respectively inspected by each said light sensitive means within said common inspection field;

second means coupled to the optical means for progressively varying the common inspection field to progressively cover the entire illuminated field; and tuned circuit means connected to the light sensitive means of the plurality to be responsive to a passband signal component in said signal, the passband being defined by the speed for varying as provided by the first and second means, there being light stops provided on the light sensitive means of the plurality.

8. In a system for inspecting a container for particles of foreign matter;

a light source disposed relative to the container to provide an illuminated field for inspection;

a plurality of light sensitive means disposed to receive light from the illuminated field, each light sensitive means of the plurality producing an electrical signal at any instant in accordance with the light as received at that instant;

optical means for directing, at any instant and onto each light sensitive means of the plurality, light from a particular area of the illuminated field, the particular areas from which light is directed to all said light sensitive means at any instant defining a common instantaneous inspection field;

first means coupled to the optical means for progressively varying the particular areas as respectively inspected by each said light sensitive means within said common inspection field;

second means coupled to the optical means for progressively varying the common inspection field to progressively cover the entire illuminated field; and tuned circuit means connected to the light sensitive means of the plurality to be responsive to a passband signal component in said signal, the passband being defined by the speed for varying as provided by the first and second means, the circuit means including a plurality of tuned circuits, each circuit of the plurality being connected to those light sensitive means of the plurality not having a common boundary.

9. In a system for inspecting a container for small particles of foreign matter, a source of light disposed relative to the container for providing light to the container to provide an illuminated field for inspection;

first means including a rotatable prism disposed relative to the container for continuously receiving light from a portion of the illuminated field of the container;

second means operatively coupled to the first means for obtaining rotation of the prism to progressively vary the area from which light is received from within the illuminated field;

a second rotatable prism disposed in the path of the light as received by the first prism for defining an eccentric inspection field within said illuminated field;

means coupled to the second prism for providing rotation to the second prism for rotating the eccentric field of inspection about the axis of rotation of the second prism;

a plurality of light sensitive means disposed to receive the light from the light path after passage through the first and second prisms and from within the eccentric inspection field; and circuit means coupled to said light sensitive means for being responsive to particular bandpass signals representative of foreign particles in the container, there being light stops provided on the light sensitive means of the plurality.

10. In a system for inspecting a container for small particles of foreign matter, a source of light disposed relative to the container for providing light to the container to provide an illuminated field for inspection;

first means including a rotatable prism disposed relative to the container for continuously receiving light from a portion of the illuminated field of the container;

second means operatively coupled to the first means for obtaining rotation of the prism to progressively vary the area from which light is received from within the illuminated field;

a second rotatable prism disposed in the path of the light as received by the first prism for defining an eccentric inspection field within said illuminated field;

means coupled to the second prism for providing rotation to the second prism for rotating the eccentric field of inspection about the axis of rotation of the second prism;

a plurality of light sensitive means disposed to receive the light from the light path after passage through the first and second prisms and from within the eccentric inspection field; and circuit means coupled to said light sensitive means for being responsive to particular bandpass signals representative of foreign particles in the container, the circuit means including a plurality of tuned circuits, each circuit of the plurality being connected to those light sensitive means of the plurality not having a common boundary.

11. In a system for inspecting a container for particles of foreign matter:

a source of radiant energy disposed relative to the container to provide an energized field through the container;

first means disposed relative to the energized field for defining an instantaneous field for inspection where the instantaneous field constitutes a portion of the energized field;

second means operatively coupled to the first means for obtaining a rotation of the instantaneous field about the energized field at a first particular frequency;

a plurality of third means disposed relative to the second means for sensing the energy in selected portions of the energized field;

fourth means disposed relative to the energized field for rotating the instantaneous field past the plurality of third means at a second particular frequency greater than the first particular frequency; and fifth means operatively coupled to the plurality of third means in a particular relationship for receiving signals in a particular frequency range related to the first and second particular frequencies to provide an indication of large and small particles in the container, the fifth means being connected to pairs of non-adjacent third means to provide the indication of large and small particles in the container.

12. In a system for inspecting a container for particles of foreign matter:

means for directing energy through the container in a particular area to define an energized field;

first means disposed relative to the energized field for progressively inspecting particular portions of the energized field on a cyclic basis at a particular rate;

a plurality of energy-responsive means disposed in spaced relationship to one another to receive the energy from the particular portions of the energized field;

second means disposed between the first means and the plurality of energy-responsive means for scanning the energy in the particular portions of the energy-responsive means at a second rate greater than the first rate; and third means connected to the energy-responsive means in the plurality in a particular relationship to produce output signals having alternating components representing small and large particles in the container, the first and second means being optical and being rotatable at frequencies related to the first and second rates and the third means being responsive only to signals having frequency components in a frequency range dependent upon the arithmetical sum and the arithmetical difference of the first and second rates to produce the output signals having alternating components representing the small and large particles in the container, the third means being connected to non-adjacent pairs of the energy-responsive means.

* * * * *